(12) United States Patent
Simitsis et al.

(10) Patent No.: US 9,135,071 B2
(45) Date of Patent: Sep. 15, 2015

(54) SELECTING PROCESSING TECHNIQUES FOR A DATA FLOW TASK

(75) Inventors: Alkiviadis Simitsis, Santa Clara, CA (US); William Kevin Wilkinson, San Mateo, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 634 days.

(21) Appl. No.: 13/213,582

(22) Filed: Aug. 19, 2011

(65) Prior Publication Data
US 2013/0047161 A1 Feb. 21, 2013

(51) Int. Cl.
*G06F 9/46* (2006.01)
*G06F 9/50* (2006.01)

(52) U.S. Cl.
CPC ........ *G06F 9/5027* (2013.01); *G06F 2209/501* (2013.01); *G06F 2209/5017* (2013.01)

(58) Field of Classification Search
None
See application file for complete search history.

(56) References Cited

U.S. PATENT DOCUMENTS

| | | | |
|---|---|---|---|
| 6,490,590 B1 * | 12/2002 | Fink | 707/602 |
| 7,185,016 B1 * | 2/2007 | Rasmussen | 1/1 |
| 8,090,873 B1 * | 1/2012 | Wookey | 709/246 |
| 2001/0004352 A1 * | 6/2001 | Watanabe et al. | 370/252 |
| 2003/0069902 A1 * | 4/2003 | Narang et al. | 707/203 |
| 2005/0080821 A1 * | 4/2005 | Breil et al. | 707/104.1 |
| 2006/0106856 A1 * | 5/2006 | Bermender et al. | 707/102 |
| 2006/0136472 A1 * | 6/2006 | Jujjuri et al. | 707/102 |
| 2008/0155058 A1 * | 6/2008 | Prasad et al. | 709/218 |
| 2008/0162590 A1 * | 7/2008 | Kundu et al. | 707/202 |
| 2008/0172674 A1 * | 7/2008 | Yee et al. | 718/106 |
| 2009/0177671 A1 * | 7/2009 | Pellegrini et al. | 707/100 |
| 2011/0047525 A1 * | 2/2011 | Castellanos et al. | 717/104 |
| 2012/0102361 A1 * | 4/2012 | Sass et al. | 714/37 |

OTHER PUBLICATIONS

Simitsis et al. (QoX-Driven ETL design; 2009).*

* cited by examiner

*Primary Examiner* — Sisley Kim
(74) *Attorney, Agent, or Firm* — Van Cott, Bagley, Cornwall & McCarthy

(57) ABSTRACT

A method for data flow processing includes determining values for each of a set of parameters associated with a task within a data flow processing job, and applying a set of rules to determine one of a set of processing techniques that will be used to execute the task. The set of rules is determined through a set of benchmark tests for the task using each of the set of processing techniques while varying the set of parameters.

20 Claims, 7 Drawing Sheets

700

Determine values for each of a set of parameters associated with a task of a data flow processing job
(block 702)

Apply a set of rules to determine one of a set of processing techniques that will be used to execute the task, the set of rules being determined through a set of benchmark tests for the operation using each of the set of processing techniques while varying the set of parameters
(block 704)

On a node of a distributed computing system, change metadata associated with data stored on a local file system of the node without copying the data to a distributed file system, the changed metadata indicating that the data is associated with the distributed file system
(block 708)

Indicate a presence of the data to a management function of the distributed file system
(block 710)

*Fig. 7B*

SELECTING PROCESSING TECHNIQUES FOR A DATA FLOW TASK

BACKGROUND

Organizations that store large amounts of data utilize database systems to manage that data. One type of database system is a data warehouse. A data warehouse is a collection of data that is structured to allow for analytical and reporting tasks. Such analytical tasks can provide decision makers with important information. The structure of data within a data warehouse is in contrast to the structure of data within operational databases which are structured to provide transactional operations to support day-to-day business operations such as sales, inventory control and accounting.

A data flow process such as an Extract, Transform, and Load (ETL) process is performed to transfer data that is formatted for operational tasks to data that is formatted for the analytical tasks associated with a data warehouse. This process involves extracting data from multiple sources. The data from these multiple sources may be formatted differently or contain details too low-level or not relevant and thus it will have to be transformed for data warehouse operations. Finally, the data is loaded into the data warehouse.

At each stage of the ETL process, various tasks are performed. For example, for the transformation stage, several tasks may be performed including filtering, sorting, joining, generating surrogate keys, and transposing. Different processing techniques may be used to perform these tasks. For example, some software applications are designed specifically for ETL processing. These applications may use certain processing techniques to perform ETL tasks. Additionally, the database management system for an operational database may use certain processing techniques for performing some of the ETL related tasks. Furthermore, a parallel processing technique may be performed on a distributed computing system. Executing the entire ETL processing flow using a single category of processing techniques may not be as efficient because some tasks within that ETL processing flow may be more efficient using different types of processing techniques.

BRIEF DESCRIPTION OF THE DRAWINGS

The accompanying drawings illustrate various examples of the principles described herein and are a part of the specification. The drawings are merely examples and do not limit the scope of the claims.

FIG. 7A is a flowchart showing an illustrative method for selecting processing techniques for ETL tasks, according to one example of principles described herein.

FIG. 7B is a flowchart showing an illustrative method for transferring files from a local file system to a distributed file system, according to one example of principles described herein.

Throughout the drawings, identical reference numbers designate similar, but not necessarily identical, elements.

DETAILED DESCRIPTION

Figure 1:
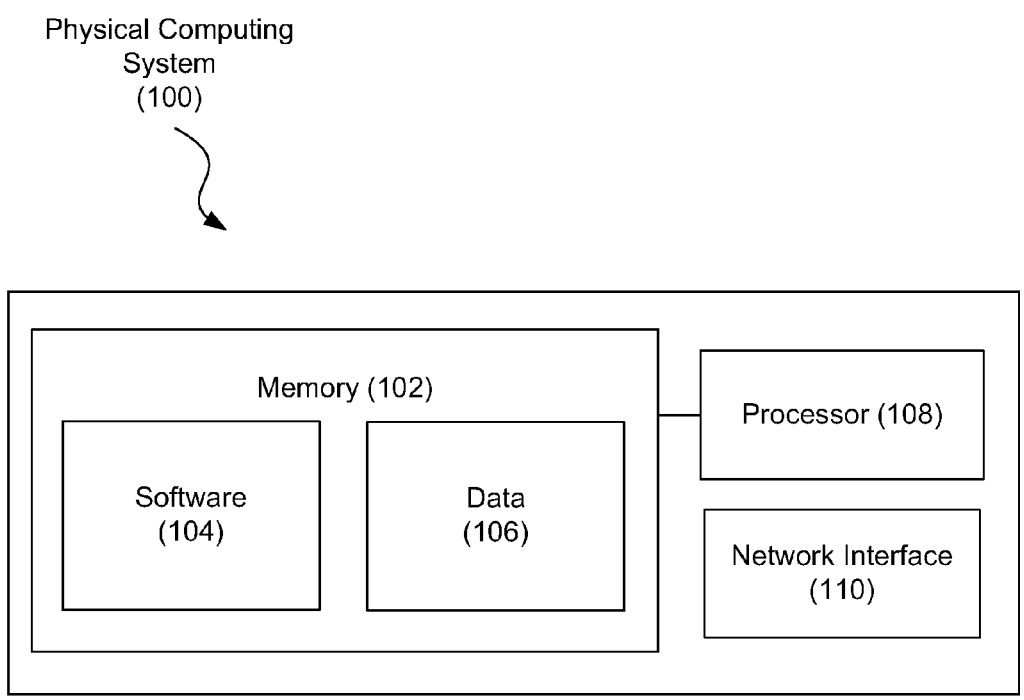
FIG. 1 is a diagram showing an illustrative physical computing system, according to one example of principles described herein.

As mentioned above, different processing techniques may be used to perform data flow tasks. For example, some software applications are designed specifically for ETL processing. These applications may use certain processing techniques to perform ETL tasks. Additionally, the database management system for an operational database or a data warehouse may use certain processing techniques for performing some of the data flow related tasks. Furthermore, a parallel processing technique may be performed on a distributed computing system. Executing the entire data flow processing flow using a single category of processing techniques may not be as efficient because some tasks within that data flow may be more efficient using different types of processing techniques.

In light of this and other issues, the present specification discloses methods and systems for determining an efficient manner to process a particular task that is part of the data flow process. The efficiency of performing a particular task may take into account the cost of transferring data to be operated on from one format to another or from one location to another if such a transformation is needed to perform a task in a particular manner.

According to certain illustrative examples, the values for a number of parameters associated with a particular task are determined. Parameters may include such features as the size of the data to be operated on, the number of nodes on a distributed computing system available to process the task, the type of task, etc. Using the values for those parameters, a decision as to which processing technique should be used is determined by applying a set of decision rules using the values of the parameters. The decision rules are based on a set of benchmark tests that have been done for various tasks with varying parameters.

For example, it may be the case that the benchmark tests have indicated that a particular task is performed more efficiently using a first processing technique if the size of the data to be operated on is less than 100 gigabytes. If the size of the data to be operated on is greater than 100 gigabytes, then it may be more efficient to perform the task using a second processing technique. Thus, if a size parameter indicates that the data for the task is 125 gigabytes, then the second method would be determined to be more efficient when applying the rules.

In some cases, using a different method may require the data to be formatted differently. For example, if the first processing technique operates on data stored on a local file system of a single computing device while the second processing technique operates on data to be stored in a distributed file system across multiple computing devices, then it may not be efficient to copy the data from the local file system to the distributed file system. Thus, even if the second processing technique would be more efficient, it might not be worth the time it takes to copy the data to the distributed file system.

To make such transformation of data more efficient and to more readily allow for different processing techniques to be used to process different tasks within a data flow process, the present specification describes a method of efficiently transferring data from a local file system to a distributed file system. According to certain illustrative examples, the metadata associated with data that indicates that it is associated with a local file system may be changed so that the metadata indicates that the data is part of a distributed file system. The data may then remain on the node associated with that local file system. However, the metadata will indicate that the data is stored on a node of a distributed file system. Thus, the data does not have to be copied to the distributed file system which would involve dividing the data into multiple chunks, each chunk being stored on a different node within the distributed file system. This process may be performed on several pieces of data stored in local file systems of several nodes.

Through use of methods and systems embodying principles described herein, the different tasks within a data flow process may be performed using different processing techniques rather than using the same processing technique to perform the entire data flow process. This allows some tasks to be performed more efficiently so that the overall data flow process is performed more efficiently. This also allows the data flow process to meet other desired design objectives such as fault tolerance, freshness, and reliability.

In the following description, for purposes of explanation, numerous specific details are set forth in order to provide a thorough understanding of the present systems and methods. It will be apparent, however, to one skilled in the art that the present apparatus, systems and methods may be practiced without these specific details. Reference in the specification to "an example" or similar language means that a particular feature, structure, or characteristic described in connection with that example is included as described, but may not be included in other examples.

Throughout this specification and in the appended claims, the term "distributed computing system" is to be broadly interpreted as a number of computing systems that process data in parallel.

Throughout this specification and in the appended claims, the term "distributed file system" is to be broadly interpreted as a file system that involves storing data on multiple computing devices.

Throughout this specification and in the appended claims, the term "data flow" is to be broadly interpreted as the process of transferring data from one location to another location. An ETL process is one example of a data flow process.

Throughout this specification and in the appended claims, the term "processing technique" is to be broadly interpreted as a specific function to be performed on data. A processing technique may be used to perform a task within a data flow processing job.

Throughout this specification and in the appended claims, the term "task", when used in the context of data flow processing, refers to a job to be processed by a computing system as part of the data flow. A task may be performed using a particular processing technique.

Referring now to the figures, FIG. 1 is a diagram showing an illustrative physical computing system (100) that may be used as to process ETL tasks. According to certain illustrative examples, the physical computing system (100) includes a memory (102) having software (104) and data (106) stored thereon. The physical computing system (100) also includes a processor (108) and a network interface (110).

There are many types of memory available. Some types of memory, such as solid state drives, are designed for storage. These types of memory typically have large storage volume but relatively slow performance. Other types of memory, such as those used for Random Access Memory (RAM), are optimized for speed and are often referred to as "working memory." The various forms of memory may store information in the form of software (104) and data (106).

The physical computing system (100) also includes a processor (108) for executing the software (104) and using or updating the data (106) stored in memory (102). The software (104) may include an operating system. An operating system allows other applications to interact properly with the hardware of the physical computing system.

A network interface (110) may provide a means for the physical computing system to communicate with other computing systems over a network. The network interface (110) may communicate over physical media such as Ethernet, coaxial, and fiber optic cables. Additionally, the network interface may communicate over wireless media by transmitting modulated electromagnetic waves and receiving such waves from other computing devices.

Figure 2:
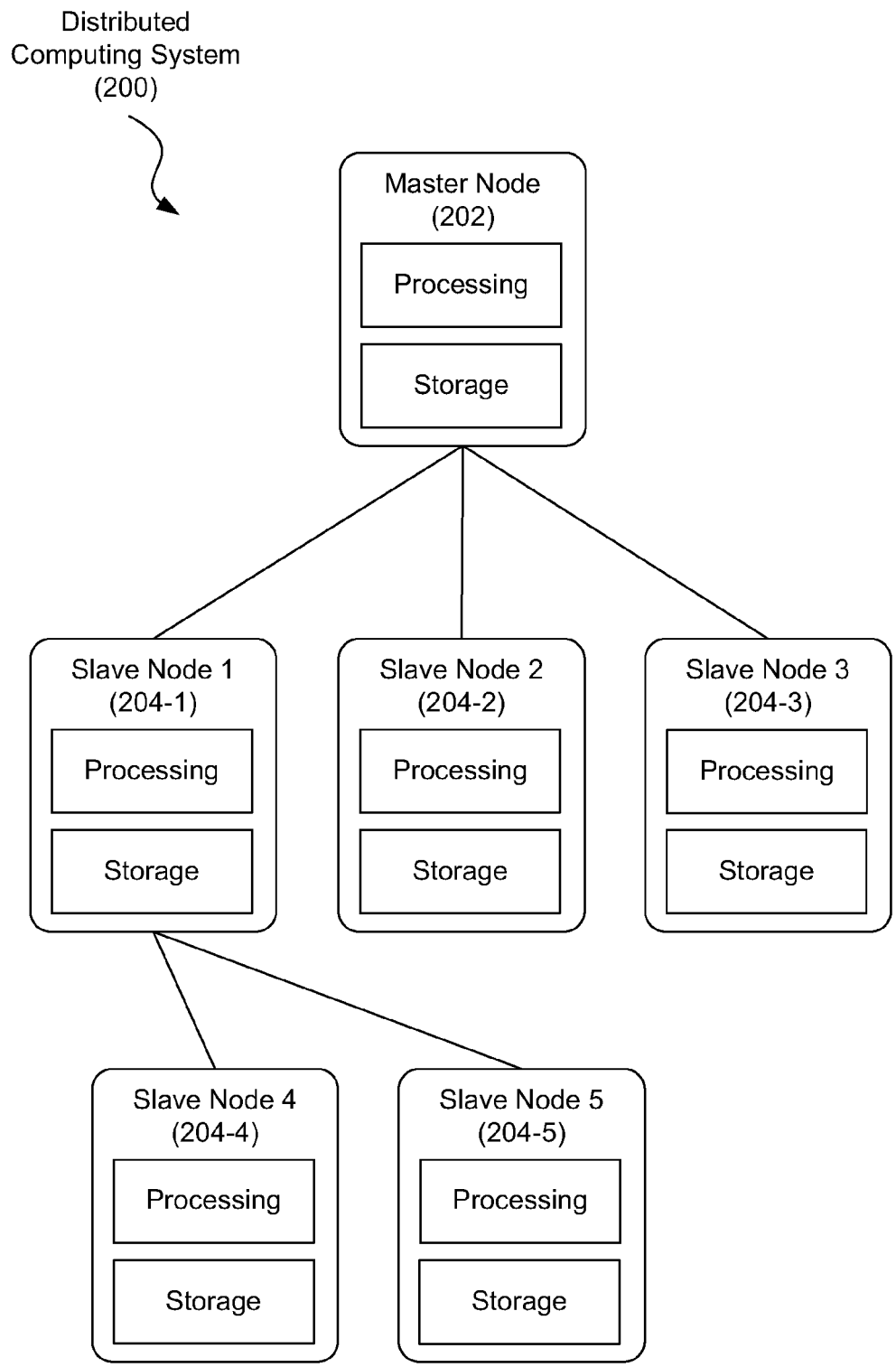
FIG. 2 is a diagram showing an illustrative distributed computing system, according to one example of principles described herein.

FIG. 2 is a diagram showing an illustrative distributed computing system (200). According to certain illustrative examples, a distributed computing system includes a master node (202) and a number of slave nodes (204). Both the master node and the slave nodes may be capable of both processing data and storing data. A set of nodes used to perform processing tasks in parallel is often referred to as a cluster.

The master node (202) is responsible for breaking up a processing job into several smaller processing jobs. Each of the smaller jobs is then sent to a slave node (204) for processing. For example, a master node may receive a processing task that is to be performed by the distributed processing system (200). The master node may then break that task into three sub-tasks. Each of those sub-tasks will then be sent to one of three slave nodes (204-1, 204-2, 204-3).

Upon receiving a sub-task from the master node (202), a slave node (204) will then perform its assigned processing job. The slave node may then either send the processing result back to the master node or onto a further node for storage. In some cases, a slave node (204-1) may further divide its assigned processing jobs into multiple jobs and distribute those jobs further to other slave nodes (204-4, 204-5). Those slave nodes (204-4, 204-5) may then perform their assigned tasks. The slave nodes (204-4, 204-5) may then send the result back to the assigning slave node (204-1) or to a different location for storage. The node to which a result is sent to may be based on the data being processed.

Figure 3A:
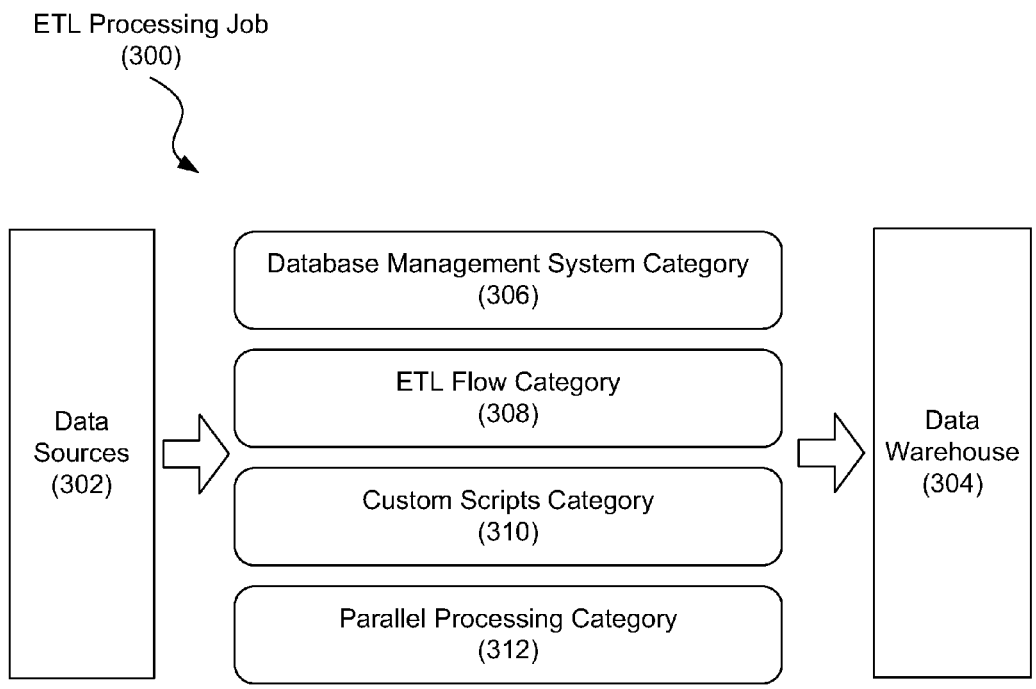
FIGS. 3A and 3B are diagrams showing illustrative options for an ETL processing flow, according to one example of principles described herein.
Figure 3B:
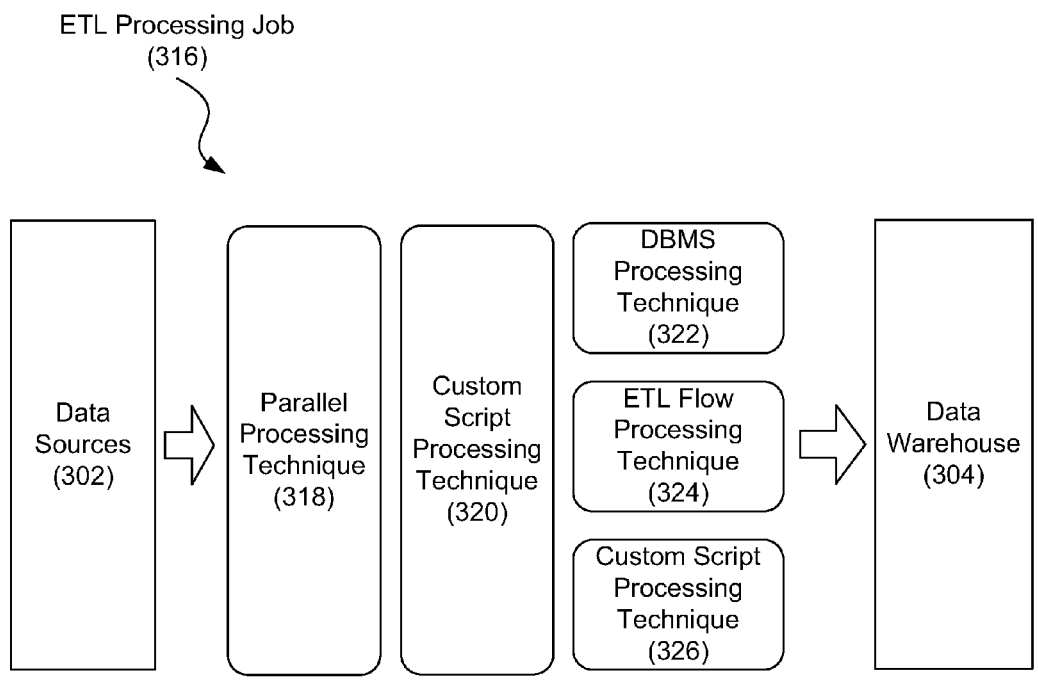

FIGS. 3A and 3B are diagrams showing illustrative options for an ETL processing flow. According to certain illustrative examples, the different processing techniques that can be used to process the various tasks within a data flow job can belong to one of several different categories of processing techniques. These categories may include, but are not limited to, a database management system flow category (306), an ETL flow category (308), a custom script category (310), and a parallel processing category (312). FIG. 3A illustrates a data flow processing job (300) wherein the tasks within that data flow processing job are performed using the same type of processing techniques.

The database management system category includes processing techniques that are available through standard database management systems, such as the open-source database management system PostgreSQL. For example, a database management system may use Structured Query Language (SQL) to perform various tasks on data such as inserting data, querying data, updating data etc. These tasks may be part of the ETL processing job. Thus, processing techniques which have a database management system perform such tasks are within the database management system category (306).

The ETL flow category (308) includes processing techniques employed by standard ETL applications. Various software applications are designed specifically to perform the various tasks within a standard ETL processing job. An example of one such software application is the commercial ETL product Informatica. The processing techniques that are used by these software applications will belong to the ETL flow category (308).

The custom scripts category (310) includes processing techniques written for a specific data flow processing job. For example, an organization may work with data having unique characteristics. Therefore, that organization may prefer to write custom scripts to perform the tasks of a data flow processing job on that data. Various different programming languages such as Java, C, or Perl may be used to write such custom scripts. Processing techniques that involve such custom scripts belong to the custom scripts category (310).

The parallel processing category (312) includes processing techniques that involve parallel processing. Such computing may be done on a distributed computing system. Various paradigms may be used when processing data on a distributed computing system. One such paradigm is a map-reduce paradigm. One example of a map-reduce processing engine is Apache™ Hadoop™. The map and reduce steps exchange data records formatted as key-value pairs. A key-value pair is a tuple of two values. One value is the key which identifies an attribute. The other value is some data that may be associated with the key. In this case, the key is used to determine to which node within a distributed computing system the key-value record should be sent. The value of the key-value record may then used for subsequent processing. The map-reduce paradigm is one example of a parallel processing paradigm. Other parallel processing paradigms may be used for processing technique selection embodying principles described herein. Processing techniques which involve such distributed computing system paradigms belong to the distributed category (312).

FIG. 3B illustrates an ETL data flow processing job (316) wherein different tasks within the ETL processing job (316) are performed using different processing techniques. According to certain illustrative examples, a first task can be done using a parallel processing technique (318). A subsequent task can be done using a custom script processing technique (320). A third task may be done by either a database system processing technique (322), an ETL flow processing technique (324), or a custom script processing technique (326). The following will describe the process by which it is decided which processing technique to use for a particular task.

Figure 4:
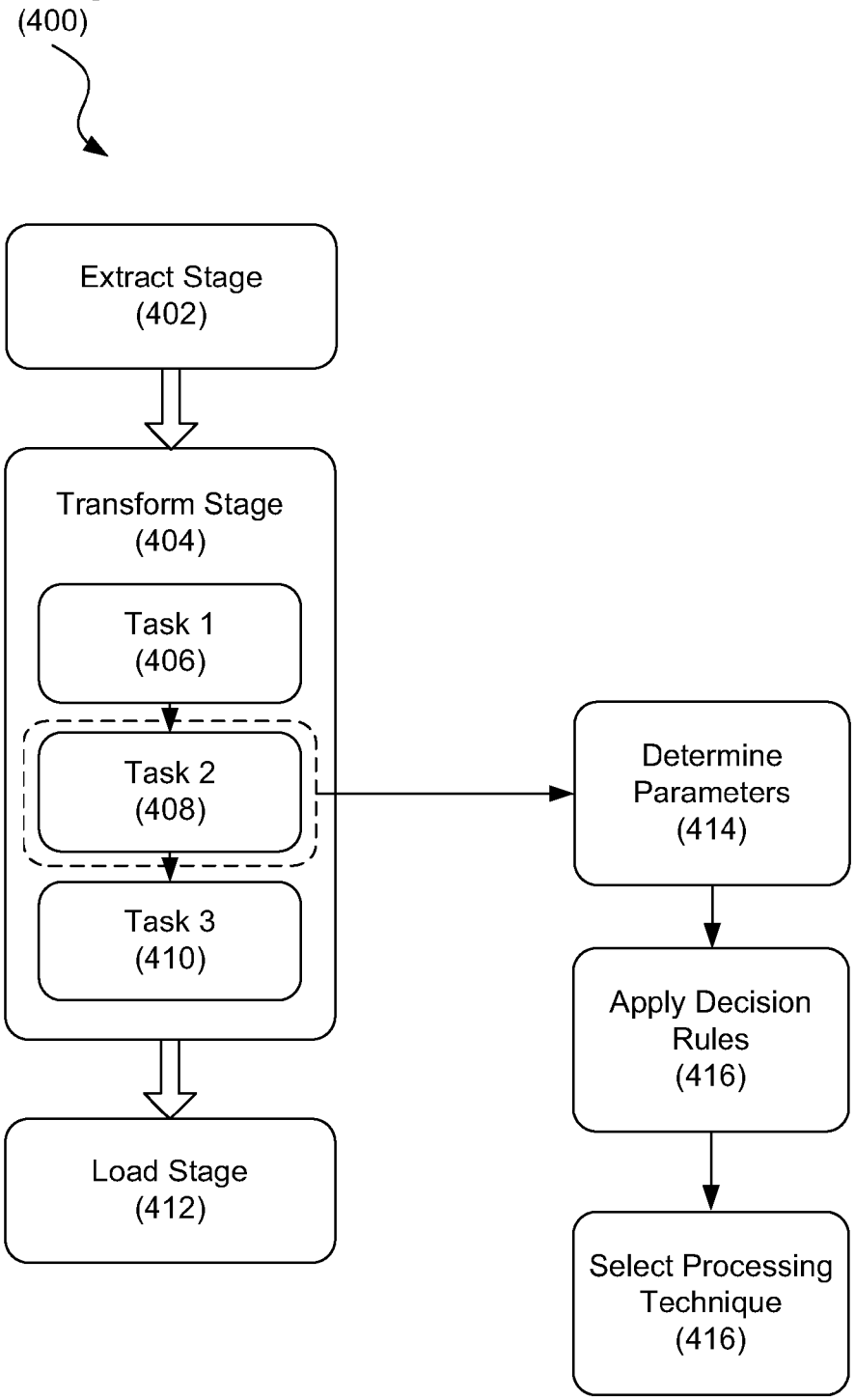
FIG. 4 is a diagram showing an illustrative decision making process for determining which type of processing techniques should be used for a task, according to one example of principles described herein.

FIG. 4 is a diagram showing an illustrative decision making process (400) for determining which processing techniques should be used for a task. As mentioned above, an ETL process involves three main stages. These stages are an extract stage (402), a transform stage (404), and a load stage (412). Each stage typically involves multiple tasks. In this example, three different tasks (406, 408, 410) are illustrated as being part of the transform stage (404). For each task, the ETL processing system determines the parameters for that task. In this example, the system determines (414) the parameters for task 2 (408).

The parameters for a task may include various characteristics about the data to be operated on, the nature of the task, and the hardware that will be processing that data. These characteristics may include, but are not limited to, the size of the data to be operated on, the number and nature of operations within the task, the number of nodes of a distributed computing system available to process the data, the network bandwidth, the workload of the nodes, fault tolerance and performance requirements, and the current format of the data.

Based on the values of these parameters associated with task 2 (408), the ETL processing system will apply (416) a set of decision rules. These decision rules are based on a set of benchmark tests that have been done for the same type of task as task 2 (408). These benchmark tests will be described in more detail below in the text accompanying FIG. 5. With the decision rules applied, the ETL processing system can select (416) an efficient processing technique to be used to perform task 2 (408). This process of determining parameters, applying decision rules, and selecting a processing technique can be used for each task within the ETL process.

For each task, the processing techniques which may be available for selection may be different. For example, a database management system may not be capable of performing a particular type of task. Thus, for that task, the set of processing techniques from which the processing technique to be used is selected will not include any processing techniques that involve the database management system.

In some cases, the stages within an ETL process may be performed in a different order. For example, the data may be extracted, loaded, and then transformed. Other variations within the ETL paradigm may be used as well.

Figure 5:
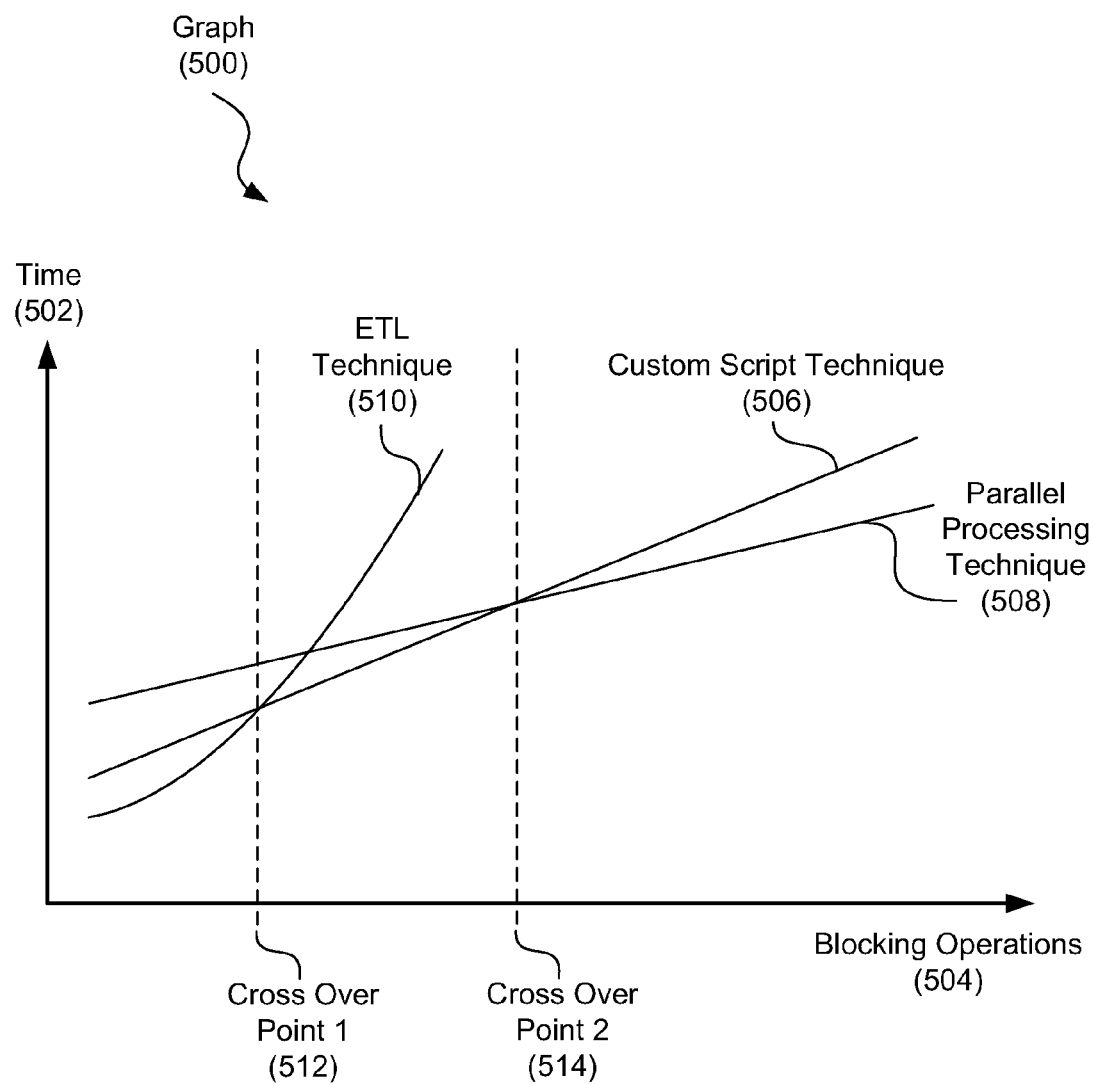
FIG. 5 is a diagram showing an illustrative graph of the results of a benchmark test used to create decision rules, according to one example of principles described herein.

FIG. 5 is a diagram showing an illustrative graph (500) of the results of a benchmark test used to create decision rules. The graph (500) illustrates the time it takes to process a particular task using three different processing techniques, each processing technique being within a different category of processing techniques. The graph illustrates the amount of time it takes as a function of number of blocking operations performed within the task. A particular task may include multiple operations. One characteristic of an operation may be whether that operation is a blocking operation or not. The blocking parameter indicates whether an operation is blocking or non-blocking.

A blocking operation is one that requires the entire input to be consumed before an output can be produced. For example, a sorting operation is considered a blocking operation because the sorting process must be completed before the next operation can proceed. An example of a non-blocking operation may be a filtering operation. A filtering operation will take an input set of data and will filter out portions of that data to create an output set of data.

The vertical axis of the graph (500) represents time (502) while the horizontal axis of the graph represents the number of blocking operations (504) within a particular task. The results of three different processing techniques are shown here. These techniques include an ETL processing technique (510), a custom script processing technique (506), and a parallel processing technique (508). In general, as the number of blocking operations increases, the time it takes to process the entire task also increases. However, the rate at which the time increases per blocking operation increase may be different among the different processing techniques. Thus, as the number of blocking operations increase, different techniques may represent the smallest amount of time.

The graph (500) illustrates two cross over points (512, 514). If the number of blocking operations is less than cross over point 1 (512), then the ETL engine processing technique would take the smallest amount of time. If the number of blocking operations is between cross over point 1 (512) and cross over point 2 (514), then the custom script processing technique may be represent the smallest amount of time. If the number of blocking operations is greater than cross over point 2 (514), then the distributed technique takes the least amount of time. Thus, a decision rule can be formulated which states that if the number of blocking operations is less than cross over point 1 (512), use the ETL processing technique (510). If the number of blocking operations is greater than cross over point 1 (512) and less than cross over point 2 (514), then use the custom script technique (506). If the number of blocking operations is greater than cross over point 2 (514), then use the distributed technique (508).

The graph (500) illustrates the varying parameter of the number of blocking operations parameter while all other parameters remain constant. Thus, the decision rule formulated from the benchmark tests used to form this graph (500) is for cases when those other parameters are of specific values. If any of the other parameters vary, then the decision rules for the parameter of number of blocking operations may vary. The decision rules for a given task will take into account multiple benchmark tests while varying several different parameters individually. Furthermore, similar benchmark tests may be run for non-blocking operations as well.

Although this specification illustrates a data flow process using an ETL process as an example, principles described herein may be used for a variety of data flow processes that involve moving data from one source to another.

In some examples, it may be the case that using a particular processing technique may involve changing the location of data. For example, it may be the case that in order to use a massive parallel processing technique to perform a particular task, the data needs to be stored on a distributed file system rather than on a local file system. The process of copying data from a local file system to a distributed file system can be relatively time consuming.

Figure 6A:
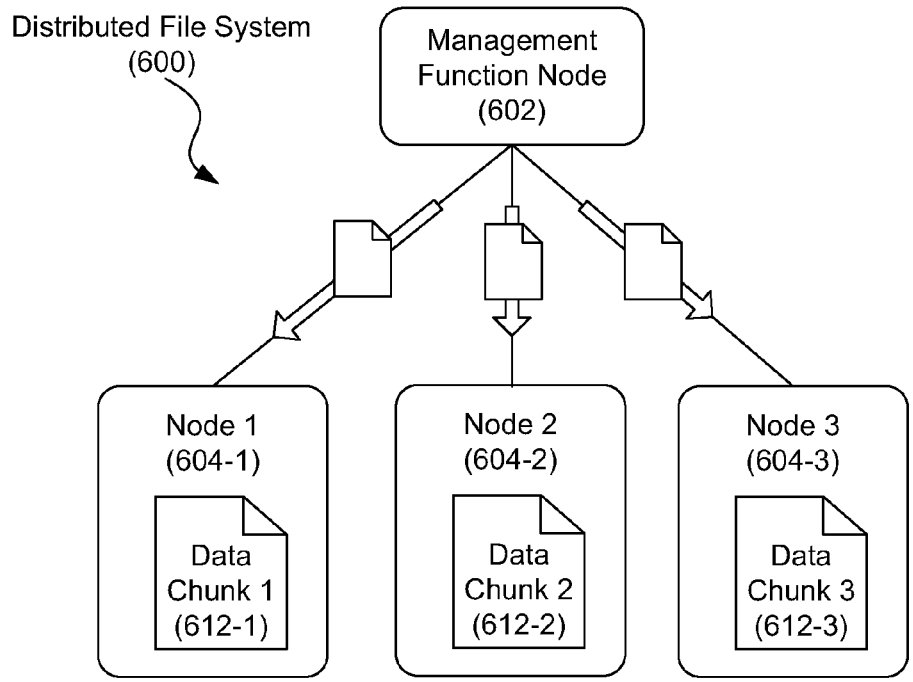
FIG. 6A is a diagram showing a traditional process of copying files to a distributed file system, according to one example of principles described herein.

FIG. 6A is a diagram showing a traditional process of copying files to a distributed file system. A file that resides on a local file system will include metadata that indicates that the file is part of a local file system. When this data is copied to a distributed file system, it is divided into smaller chunks of data and placed across multiple nodes.

According to certain illustrative examples, data that is stored on a local file system is copied to the distributed file system (600). A management function node (602) then splits that data into multiple chunks and sends each chunk of data to a different node. The management function node (602) may be any computing device of the distributed file system (600) that includes management functions for the distributed file system (600). In the example of FIG. 6A, the data is divided into three chunks (612). A first chunk (612-1) is sent to node 1 (604-1), a second chunk (612-2) is sent to node 2 (604-2), and a third chunk (612-3) is sent to node 3 (604-3). Each chunk of data includes metadata that indicates its place within the distributed computing system (600).

Figure 6B:
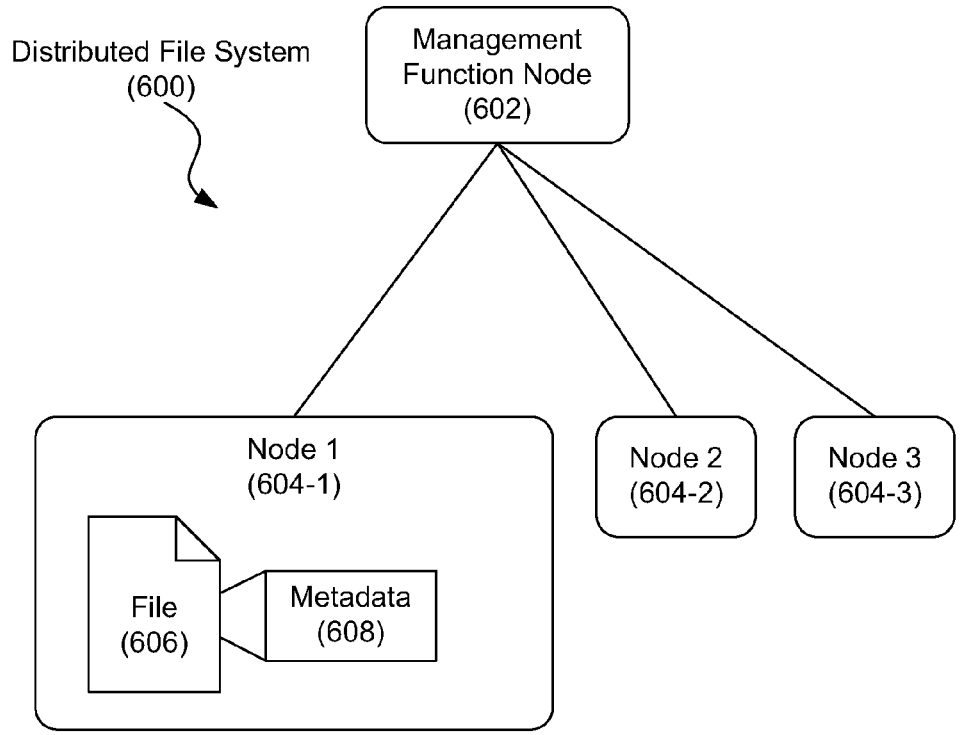
FIG. 6B is a diagram showing a more efficient process of transferring files to a distributed file system, according to one example of principles described herein.

FIG. 6B is a diagram showing a more efficient process of transferring files from a local file system to a distributed file system. According to certain illustrative examples, if a file (606) is stored on a local file system of a node (604-1), then the metadata (608) that indicates that the file is part of a local file system can be changed so that the changed metadata (608) indicates that the data is part of the distributed file system (600). A management function for the distributed file system may then be informed of the file's (606) presence on the distributed file system (600). In some cases, this process may involve adding new metadata to the distributed file system that indicates the presence of the file on that system. In this case, no metadata embedded within the file of the local file system will be changed.

By changing the metadata (608) of a file (606) rather than actually copying the file to the distributed file system (600), the process of distributing the file across multiple nodes can be avoided. In some cases, when the network load falls below a predetermined threshold, the file stored on the node (604-1) can be rebalanced and redistributed to the other nodes (604-2, 604-3). However, it may be the case that the data is processed into a different form and moved elsewhere. Therefore, it would not have to be rebalanced.

In some cases, files that are stored on a distributed file system can be transferred to a local file system using a similar process. Throughout this specification and in the appended claims, the term "distributed data" will refer to data that is stored on a particular node as part of a distributed file system. According to certain illustrative examples, metadata associated with distributed data stored on a particular node can be changed so that it indicates that the distributed data is part of a local file system. This process can be used to transfer a file stored across multiple nodes of a distributed file system into multiple files on the local file systems of those respective nodes.

FIG. 7A is a flowchart showing an illustrative method (700) for selecting processing techniques for data flow tasks. According to certain illustrative examples, the method includes, determining (block 702) values for each of a set of parameters associated with a task within a data flow processing job, and applying (block 704) a set of rules to determine one of a set of processing techniques that will be used to execute the task, the set of rules being determined through a set of benchmark tests for the task using each of the set of processing flows while varying the set of parameters.

FIG. 7B is a flowchart showing an illustrative method (706) for transferring files from a local file system to a distributed file system. According to certain illustrative examples, the method includes, on a node of a distributed computing system, changing (block 708) metadata associated with data stored on a local file system of the node without copying the data to a distributed file system, the changed metadata indicating that the data is associated with the distributed file system, and indicating (block 710) a presence of the data to a management function of the distributed file system.

In conclusion, through use of methods and systems embodying principles described herein, the different tasks within a data flow process may be performed using different processing techniques rather than using the same processing technique to perform the entire data flow process. This allows some tasks to be performed more efficiently so that the overall data flow process is performed more efficiently.

The preceding description has been presented only to illustrate and describe examples of the principles described. This description is not intended to be exhaustive or to limit these principles to any precise form disclosed. Many modifications and variations are possible in light of the above teaching.

What is claimed is:

1. A method for selecting processing techniques for a data flow task performed by a physical computing system, the method comprising:
   determining values for each of a set of parameters associated with a task within a data flow processing job; and
   applying a set of rules to said values to determine one of a set of processing techniques that will be used to execute said task;
   wherein said set of rules is determined through a plurality of benchmark tests for said task using each of said set of processing techniques while varying said set of parameters, wherein said plurality of benchmark tests comprise at least one crossover point defining a transition between a first parameter range where a first processing technique completes said task in a smallest amount of time and a second parameter range where a second processing technique completes said task in the smallest amount of time.

2. The method of claim 1, wherein said set of processing techniques includes at least one of: a map-reduce processing technique, a database management system processing flow, an Extract, Transform, Load (ETL) engine processing flow, and a custom script processing flow.

3. The method of claim 1, wherein said set of parameters comprises at least one of: a blocking operator parameter, a number of nodes parameter, a data size parameter, a network bandwidth parameter, and a reduce job parameter.

4. The method of claim 1, further comprising, applying said set of rules to determine one of said set of processing techniques for each of an additional number of tasks within said data flow processing job based on parameters of said additional tasks.

5. The method of claim 1, wherein said set of rules considers a cost of transforming data associated with said data flow processing job to a different format to use a different one of said set of processing techniques.

6. The method of claim 5, wherein a cost of transforming said data from a local file system to a distributed file system takes into account a process of changing metadata for stored data on a local file system to indicate that said stored data is part of a distributed file system without actually copying said stored data from said local file system to said distributed file system.

7. The method of claim 6, wherein said stored data with changed metadata is reallocated across said distributed file system in response to specified conditions of a network connecting said distributed file system.

8. The method of claim 1, wherein said plurality of benchmark tests define a number of blocking operations.

9. A method for transferring data from a local file system to a distributed file system for a data flow process, the method comprising:
   on a node of a distributed computing system, changing metadata associated with data stored on a local file system of said node without copying said data to a distributed file system, said changed metadata indicating that said data is no longer associated with said local file system, but is associated with said distributed file system; and
   indicating a presence of said data to a management function of said distributed file system;
   wherein, a cost of transferring said data from said local file system to said distributed file system is used in part to define a set of rules used to determine through a plurality of benchmark tests which of a set of processing techniques is to be used for a task of a data flow process based on parameters associated with said task and said distributed file system,
   wherein said rules are based on based on the plurality of benchmark tests comprising at least one crossover point defining a transition between a first parameter range where a first processing technique completes said task in a smallest amount of time and a second parameter range where a second processing technique completes said task in the smallest amount of time.

10. The method of claim 9, further comprising, on each of a number of additional nodes within said distributed computing system, changing metadata associated with stored data on a local file system of that additional node to indicate that said stored data on that additional node is associated with said distributed file system without copying said stored data on that additional node to said distributed file system.

11. The method of claim 9, further comprising, rebalancing data spread across multiple nodes of said distributed filing system in response to specified conditions of a network connecting said distributed file system.

12. The method of claim 11, wherein said specified conditions comprises a load of said network falling below a predetermined threshold level.

13. The method of claim 9, wherein a cost of transferring said data from said local file system to said distributed file system is considered in a set of rules used to determine which of a set of processing techniques is to be used for a task of a data flow process based on parameters associated with said task and said distributed file system.

14. The method of claim 9, further comprising, changing metadata of distributed data stored on said node within said distributed file system to indicate that said distributed data is part of a local file system on said node.

15. A distributed computing system comprising:
   a node comprising:
      at least one processor; and
      a memory communicatively coupled to the at least one processor, the memory comprising computer executable code that, when executed by the at least one processor, causes the at least one processor to:
         change metadata associated with data stored on a local file system of said node without copying said data to a distributed file system, said changed metadata indicating that said data is no longer associated with said local file system, but is associated with said distributed file system; and
         indicate a presence of said data to a management function of said distributed file system;
      wherein, a cost of transferring said data from said local file system to said distributed file system is used in part to define a set of rules used to determine, through a number of benchmark tests, which of a set of processing techniques is to be used for a task of a data flow process based on parameters associated with said task and said distributed file system, wherein said rules are based on the number of benchmark tests comprising at least one crossover point defining a transition between a first parameter range where a first processing technique completes said task in a smallest amount of time and a second parameter range where a second processing technique completes said task in the smallest amount of time.

16. The system of claim 15, wherein said set of processing techniques includes at least one of: a map-reduce processing flow, a database management system processing flow, an Extract, Transform, Load (ETL) engine processing flow, and a custom script processing flow.

17. The method of claim 1, wherein said set of benchmark tests comprise:
   varying a parameter within said set of parameters over a range for a simulated task; and
   measuring execution times for each of said processing techniques to perform said simulated task over said range.

18. The method of claim 1, wherein said set of benchmark tests comprise a crossover point, wherein said set of rules comprises applying a first processing technique for said task when a said value for said task falls below said crossover point and applying a second processing technique when said value falls above said crossover point.

19. The system of claim 15, wherein said benchmark tests define which of said set of processing techniques is most time efficient based on a parameter associated with said task, wherein said set of benchmark tests comprise varying said parameter over a range and measuring which of said processing techniques is most time efficient in execution said task.

20. The system of claim 19, wherein said parameter is a number of blocking operations in said task and said set of benchmark tests comprise measuring an execution time for simulated tasks with a range of blocking operations for each processing flow in said set of processing techniques.

\* \* \* \* \*